United States Patent Office 3,332,361
Patented July 25, 1967

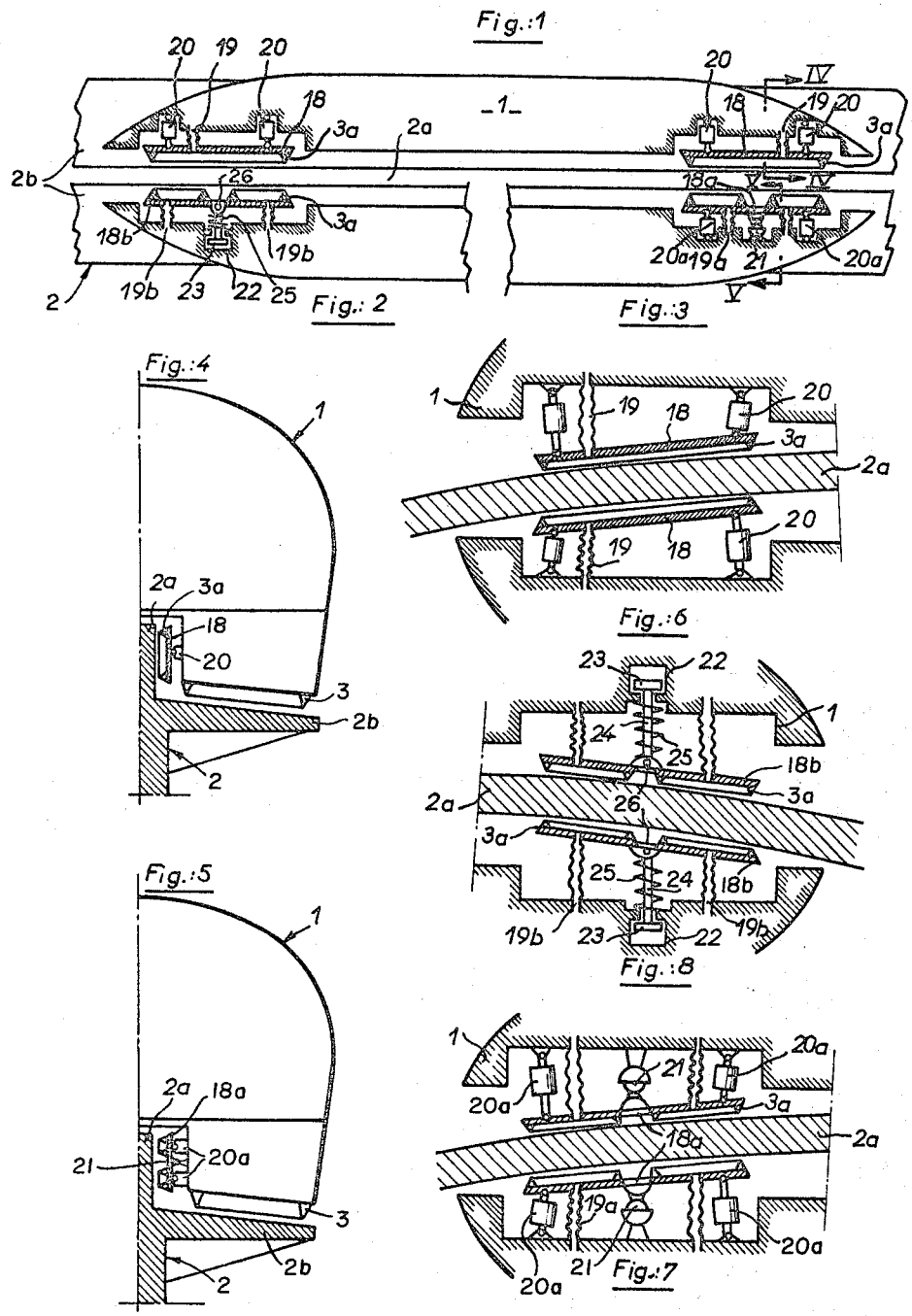

3,332,361
PRESSURE FLUID CUSHION GUIDING SYSTEM
FOR TRACKED GROUND EFFECT MACHINES
Jean Henri Bertin, Neuilly-sur-Seine, and Paul Francois
Guienne, Paris, France, assignors, by mesne assignments, to Societe d'Etudes de l'Aerotrain, Plaisir,
France, a corporation of France
Filed Mar. 8, 1965, Ser. No. 437,722
Claims priority, application France, Mar. 10, 1964,
966,859
6 Claims. (Cl. 104—120)

ABSTRACT OF THE DISCLOSURE

A pressure fluid cushion guiding system for a ground effect machine movable on an inverted-T section track with a central upright guiding portion and two side base supporting portions, said track having bends. The guiding system comprises plenum chambers positioned on both sides of said central upright portion and mounted for oscillation with respect to the body of the machine.

The present application is a continuation-in-part of application Ser. No. 288,386, filed June 17, 1963, now Patent No. 3,190,235, the aforementioned application 288,386 benefiting from a prior foreign filing date of June 26, 1962, the benefit of which is also claimed for this application.

This invention relates to vehicles which are supported and guided, through the medium of fluid cushions, by tracks compising substantially horizontal supporting surfaces and substantially vertical oppositely orientated guiding surfaces. The invention is likewise applicable, however, to vehicles associated to tracks whose guiding surfaces are at the same time supporting surfaces.

It is the principal object of the present invention to render fluid-cushion-supported vehicles more practical, effective and reliable by enabling them to follow tracks of the type referred to that embody relatively sharp bends in plan view. This is achieved without the need for guiding fluid-cushions of unduly large height and leakage rate by making the devices which bound said fluid-cushions orientable in the horizontal plane at least.

Each such device may define a plurality of elemental guiding fluid-cushions that are preferably supplied with pressure fluid independently. Several possible methods of mounting them on the body or chassis of the vehicle are given by way of example.

The description which follows with reference to the accompanying non-limitative exemplary drawings will give a clear understanding of how the invention can be carried into practice.

In drawings,

FIGURE 1 is a schematic horizontal half-section, on a reduced scale, of a vehicle according to the invention, showing the relative size and location of an air cushion-type orientable lateral thrust device;

FIGURES 2 and 3 are alternative forms of embodiment of the thrust device of FIGURE 1:, FIGURES 4 and 5 are fragmental cross-sections through the lines IV—IV and V—V of FIGURES 1 and 3 respectively; and FIGURES 6, 7 and 8 are detail views in horizontal section of FIGURES 1 through 3.

Referring to the accompanying figures, there is shown thereon a vehicle 1 associated to a guiding track 2, made of concrete for example, comprising a vertical axial rail or central upright guiding portion 2a and two substantially horizontal supporting flanges 2b. Through the medium of a plurality of air cushions bounded by deformable peripheral seals 3, the vehicle 1 bears alike against the sides of the vertical rail 2a and against the supporting surfaces of the flanges 2b.

The guiding fluid-cushions which help the vehicle to negotiate curved tracks whose radius of curvature may be relatively small are preferably formed at the two ends of the vehicle, between the rail 2 and orientable plates 18 equipped with flexible seals 3a. Said cushions are supplied with fluid through flexible conduits 19 by any convenient generator of pressure-fluid. The length of said orientable plates is preferably included between one-fifth and one-quarter of the total length of the vehicle.

As FIGURES 1, 4 and 6 clearly show, the position of a fluid-cushion device 18, 3a can be changed by means of only two actuators 20. These actuators can either be controlled by the pilot or be slaved to a curvature detector, an example being at least one fluid cushion-type feeler which follows the guiding track. The axes about which the actuators pivot are substantially parallel to the guiding surfaces of the rail 2a and perpendicular to the direction of travel of the vehicle, and are hence approximately vertical.

Reference is now had to FIGURES 3, 5 and 7 for a first alternative constructional form comprising a plate 18a equipped with flexible seals 3a which form a plurality of fluid cushions between the plate and the rail 2a somewhat like a bogie (with four cushions, say). The plate or bogie 18a is pivotable about a ball-and socket joint 21 responsively to four actuators 20a.

In a second form of embodiment shown in FIGURES 2 and 8, a plate 18b and flexible seals 3a jointly form a bogie consisting of two fluid cushions, supported by a pivot 26 of substantially vertical axis located between said cushions. The independent supplying of the several fluid cushions makes such a bogie autostable by allowing it to adopt a natural position substantially parallel to the guiding track in response to the pressure forces exerted by the cushion. The distance from said track, i.e. the leakage height of the cushions, establishes itself automatically, responsively to the fluid pressure forces in the cushion, to a spring 25 and to a damper 22 which may be of the hydraulic type. A strut 24 serves to guide the bogie in relation to the structure of the vehicle, and this strut is integral with a piston 23 which is movable inside the damper 22.

What is claimed is:

1. A pressure fluid guiding system for a ground effect machine movable along a track which is in cross section in the general shape of an inverted-T with an upwardly projecting central upright portion having two oppositely outwardly facing, side surfaces adjacent one another and designed for guiding said machine, said pressure fluid guiding system cooperating with said side surfaces and comprising oppositely inwardly facing plenum chambers positioned on both sides of said central upright portion and defining with the respective outwardly facing surfaces pressure fluid cushions between which said central upright portion is sandwiched, each plenum chamber comprising a backing plate extending generally parallel to said side surfaces and a peripheral wall means projecting from said backing plate toward the respective surface and ending short of the same with a free edge which defines therewith a leakage gap for the pressure cushion fluid, wherein the improvement comprises support means carrying said backing plate for angular displacement relatively to said machine at least about an axis substantially parallel to said side surfaces and perpendicular to the direction of motion of said machine, whereby said plenum chambers are oscillatable to harmonize with bends in said upright portion and keep said free edge in close proximity to the adjacent track surface, thus minimizing leakages through said leakage gap.

2. Guiding system as claimed in claim 1, wherein said plates are arranged in pairs on opposite sides of said upright portion with said oscillatory support means thereof lying substantially at a same transverse plane with respect to said direction of motion.

3. Guiding system as claimed in claim 1, wherein at least two separate and distinct plenum chambers are associated with a same backing plate at locations thereof spaced longitudinally with respect to said direction of motion, on opposite sides of said oscillatory support means, whereby to produce opposite moments thereabout.

4. Guiding system as claimed in claim 3, wherein said oscillatory support means comprises a ball-and-socket joint allowing universal angular displacement of said backing plate.

5. Guiding system as claimed in claim 3, wherein said oscillatory support means comprise a pivot hinge extending along said axis substantially parallel to said side surfaces and perpendicular to the direction of motion of said machine.

6. Guiding system as claimed in claim 1, further comprising actuating means extending between said machine and said plate for positively adjusting the relative angular setting thereof about said axis.

References Cited
UNITED STATES PATENTS 3,111,093   11/1963   Jay _____ 104—134

FOREIGN PATENTS 111,698   5/1962   Pakistan.

ARTHUR L. LA POINT, *Primary Examiner.*

J. E. BABER, *Assistant Examiner.*